United States Patent
Moritz et al.

(10) Patent No.: US 6,704,618 B1
(45) Date of Patent: Mar. 9, 2004

(54) CONTAINER-BASED SYSTEM FOR GENERATION AND DISPERSAL OF PRINTED MATERIALS

(75) Inventors: Elan Moritz, Lynn Haven, FL (US); Helmut Portmann, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 141 days.

(21) Appl. No.: 10/134,847

(22) Filed: Apr. 29, 2002

(51) Int. Cl.$^7$ .............................................. G06F 17/00
(52) U.S. Cl. ...................... 700/244; 700/241; 700/235; 244/136
(58) Field of Search ................... 700/213, 231, 700/233, 235, 241, 244; 244/136, 137.1, 118.2

(56) References Cited

U.S. PATENT DOCUMENTS

| | | | | |
|---|---|---|---|---|
| 6,032,574 A | * | 3/2000 | Brayton et al. | ................ 99/486 |
| 6,056,237 A | * | 5/2000 | Woodland | ................... 244/3.15 |
| 6,130,705 A | * | 10/2000 | Lareau et al. | ................ 348/144 |
| 6,622,063 B1 | * | 9/2003 | Moritz et al. | ................ 700/231 |

* cited by examiner

Primary Examiner—Khoi H. Tran
(74) Attorney, Agent, or Firm—Donald G. Peck; Harvey A. Gilbert (57) ABSTRACT

An unmanned, real-time, printed material generation and dispersal system includes a standardized shipping container houses at least one printing module capable of generating printed materials, a controller module for controlling the generation of the printed materials and monitoring status of the printing module, a communications module for communicating with the printing module and transmitting the status to a remote location, and a dispenser for receiving the printed materials so-generated and expelling them from the shipping container.

40 Claims, 7 Drawing Sheets

CONTAINER-BASED SYSTEM FOR GENERATION AND DISPERSAL OF PRINTED MATERIALS

ORIGIN OF THE INVENTION

The invention described herein was made in the performance of official duties by a employees of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "CONTAINER-BASED PRODUCT DISPENSING SYSTEM" (Navy Case No. 83654) by the same inventors as this patent application.

FIELD OF THE INVENTION

The invention relates generally to product dispensing systems, and more particularly to an unmanned system that generates and disperses printed materials in a controlled fashion.

BACKGROUND OF THE INVENTION

Currently, "products" such as leaflets, food packets, sand bags, supplies and other materials that must be air dropped or air-delivered for military or civilian (e.g., disaster relief, emergency response, etc.) purposes are generated or manufactured, packaged, handled, transported to airfields, loaded into aircraft, flown to the area of interest and then dropped from the aircraft over the area of interest. Alternatively, the products are delivered to airfields for truck or other manual distribution. In either case, a substantial amount of handling and transfer operations are typically required thereby making the process time consuming and expensive. Further, in terms of dispersal of pre-printed materials such as leaflets, rapidly changing situations may obsolete information in the pre-printed materials before they are even dispersed over a geographic area.

SUMMARY OF THE INVENTION

Accordingly, it is an object of the present invention to provide an efficient product dispensing:system that can be used to both generate and disperse printed materials in real time.

Another object of the present invention is to provide a printed materials generation/dispersal system that can be used to generate and disperse printed materials in the air from an aircraft.

Still another object of the present invention is to provide an unmanned printed material generation/dispersal system that can carry out its operation in accordance with a scheme that is pre-programmed in the system or is remotely-transmitted to the system.

Other objects and advantages of the present invention will become more obvious hereinafter in the specification and drawings.

In accordance with the present invention, an unmanned system is provided for the real time generation and dispersement of printed materials. A standardized shipping container houses at least one printing module capable of generating printed materials. A controller module is mounted in the shipping container and is coupled to the printing module to control the generation of the printed materials and monitor status of the printing module. A communications module is also mounted in the shipping container and is coupled to the controller module for communicating with the printing module (via the controller module) and for transmitting the status to a remote location. A dispenser is coupled to the printing module for receiving the printed materials so-generated and for expelling the printed materials from the shipping container.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
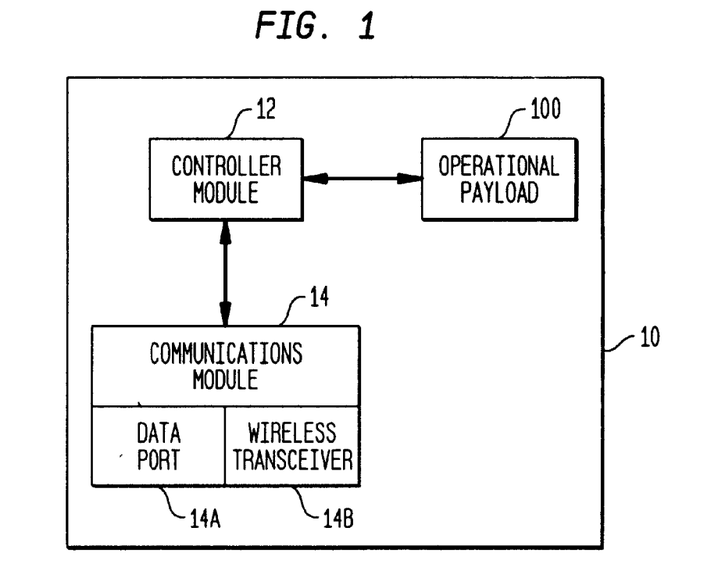
FIG. 1 is a schematic view of an unmanned system used for the delivery and control of an operational payload which, in the present invention, provides for the dispensing of products.

Referring now to the drawings, and more particularly to FIG. 1, a schematic view of an unmanned system for the delivery and control of an operational payload 100 is illustrated. This system is disclosed by applicants in a co-pending patent application entitled "STANDARDIZED CONTAINER PAYLOAD DELIVERY AND CONTROL SYSTEM", Navy Case No. 83610. The system includes a shipping container 10 with a controller module 12 and a communications module 14 mounted within shipping container 10. In terms of the present invention, operational payload 100 is representative of any type of system that involves the dispensing of items from shipping container 10. Dispensed items include military and nonmilitary prepackaged products such as materials and supplies, as well as products that are generated, manufactured or assembled in shipping container 10 just prior to their being dispensed therefrom.

Figure 2:
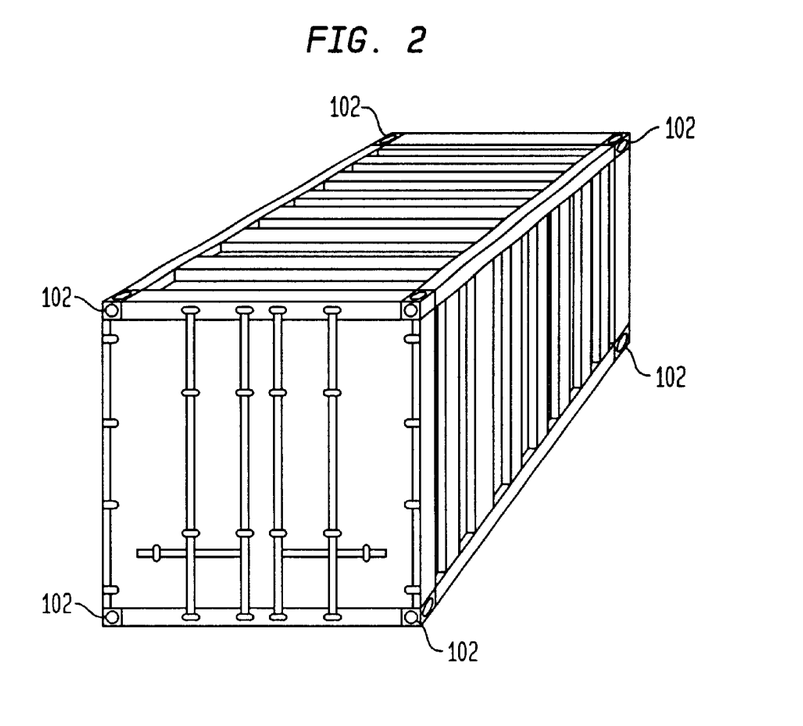
FIG. 2 is a perspective view of an ISO shipping container.

Shipping container 10 is any existing or specially-designed standardized shipping container having standardized outer dimensions and features to allow the use of existing handling, transportation and storage equipment/facilities that are used by a wide variety of military and commercial applications. For example, shipping container 10 could be a container constructed in accordance with standards set forth by the International Organization for Standardization or ISO as it is known. A standard ISO shipping container is illustrated in FIG. 2 where, as is known in the art, corner fittings 102 provide the means for handling the container. Corner fittings 102 could also provide for the coupling of adjacent shipping containers. Further, the standard outer dimensions of the ISO shipping container are already relied upon by both military and commercial organizations.

Controller module 12 is representative of application-specific hardware and software that cooperates to control the functions of operational payload 100. Such command and control of operational payload 100 can be pre-programmed into controller module 12 or can be provided in real time as will be explained further below. If pre-programmed, controller module 12 could be configured to trigger an operational sequence, for example, at a predetermined time, at a predetermined location, in response to a sensed condition, etc.

Communication with controller module 12 and operational payload 100 is made possible by communications module 14. Such communication could be limited to monitoring the functions of controller module 12 and/or the status of operational payload 100. Transfer of information from communications module 14 could occur through direct/hardwire coupling thereto (e.g., via a data port 14A accessible on the exterior of shipping container 10) by a hand-held or other portable computer. Additionally or alternatively, communications module 14 could include equipment capable of transmitting monitored data to a remote location. In such cases, communications module 14 could include a wireless transceiver 14B for transmitting (e.g., via an antenna) the monitored data in a wireless fashion for receipt at a remote location. Further, wireless transceiver 14B could be used to transfer control of operational payload 100 to an external controller (not shown) should controller module 12 fail or for other reasons.

Wireless transceiver 14B could also serve as a receiver of instructions used to program controller module 12 in order to ultimately control the functions of operational payload 100. In this way, the present invention provides for the remote control of operational payload 100 in real time. Thus, shipping container 10 could be delivered to a destination with on-site operation of the payload being brought about in an "unmanned" fashion from a remote location.

While FIG. 1 and the above description illustrate some basic elements of the present invention, additional features can be incorporated. Some of these features will now be described with the aid of FIG. 3 where all or any single one or combination of the illustrated and described features could be incorporated with the basic system illustrated in FIG. 1 depending on application requirements. Should a global position of shipping container 10 be required, such position information can be provided by either or both of a Global Positioning System (GPS) module 20 and an inertial navigation system (INS) module 22 which supply the determined position information to controller module 12.

Figure 3:
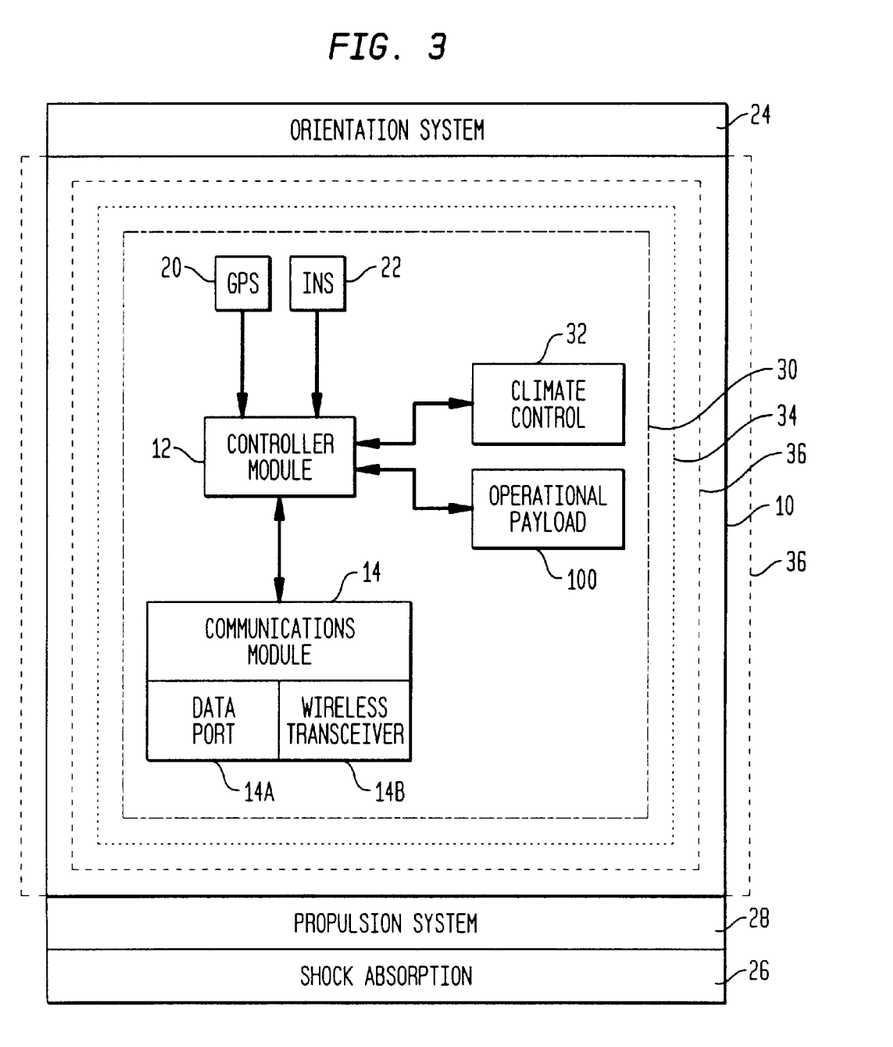
FIG. 3 is a schematic view of the unmanned system further equipped with a variety of positioning and protection features.

In applications requiring the release of shipping container 10 in a fluid environment such as the air or water, it may be necessary to couple an orientation system 24 to shipping container 10. Orientation system 24 represents any apparatus or system designed to place shipping container 10 in a preferred orientation once it is released into a fluid environment. Accordingly, orientation system 24 could include, but is not limited to, parachutes control surfaces and ballast devices. A shock absorption system 26 may also be required to absorb impact shocks when shipping container 10 hits the ground. Such shock absorption could include parachutes, springs, air cushions, etc.

Some applications may require shipping container 10 to travel short distances or be maneuvered at its delivery destination. For these applications, a propulsion system 28 can be provided and coupled to shipping container 10. Control for propulsion system 28 would be governed by controller module 12.

Should any or all of controller module 12, communications module 14 and operational payload 100 be moisture sensitive, it may be necessary to waterproof the contents of shipping container 10. Such, waterproofing is indicated by dot-dash line 30. Additionally, a climate control module 32 (e.g., air conditioning, heating, humidity, air pressure, etc.) can be provided in shipping container 10 and placed under the control of controller module 12. It may also be necessary to protect the contents of shipping container 10 from electromagnetic interference (EMI). Accordingly, EMI shielding can be provided as indicated by dotted line 34. Still further, it may be necessary to protect the contents of shipping container 10 from various shock and/or vibration forces. For example, if protection from incoming projectiles is a concern, armor can be provided about some or all of the interior and/or exterior of shipping container 10 as indicated by dashed lines 36.

Figure 4:
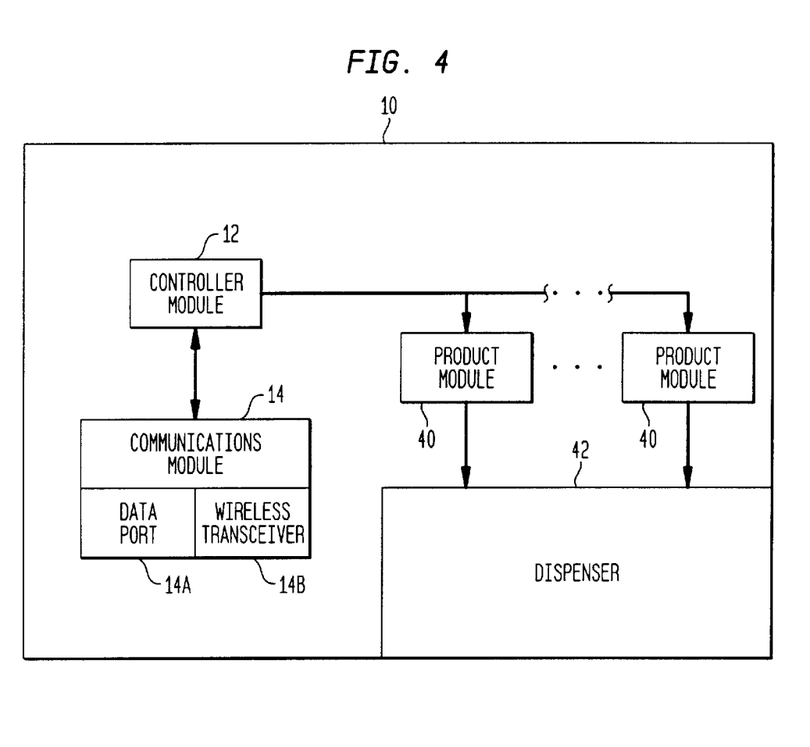
FIG. 4 is a schematic view of an unmanned system further equipped to manipulate and dispense products from a shipping container in accordance with the present invention.

In the present invention, the operational payload provides for the dispensing of a wide variety of items. Accordingly, FIG. 4 illustrates the general features that must be incorporated with the basic FIG. 1 design in order to accomplish the dispensing tasks. One or more product modules 40, under the control of controller module 12, are provided in shipping container 10. Each of product modules 40 is capable of providing one or more products (not shown) to a dispenser 42 that expels the products from shipping container 10. Each of product modules 40 can be a stand-alone module that provides its products in a pre-packaged form when commanded to do so by controller module 12. Product modules 40 can also be configured to generate the products from a stored supply of raw materials when commanded by controller module 12. While the particular products provided by product modules 40 need not be the same, the products would typically be the same in terms of their outer dimensions and weight to simplify the design of dispenser 42.

As mentioned above, the general function of dispenser 42 is to expel the products it receives from shipping container 10. Dispenser 42 can be configured as either a "dumb" or "smart" functional element of the present invention. That is, in its "dumb" configuration, dispenser 42 would automatically dispense any product received from product modules 40. However, in its "smart" configuration, dispenser 42 would be controlled by controller module 12 to dispense its received products only when instructed to do so.

Figure 5:
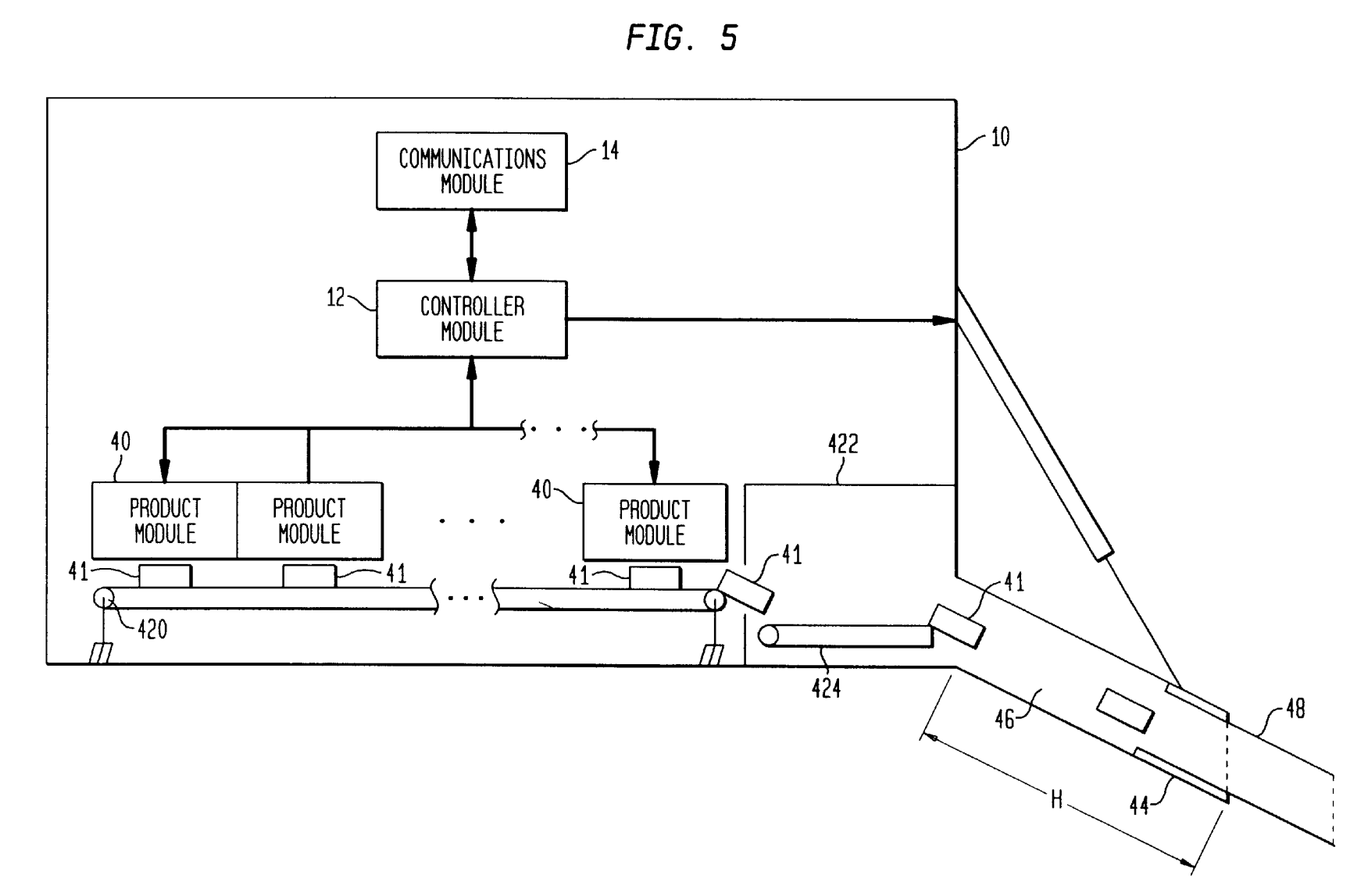
FIG. 5 is a schematic view of an unmanned system that provides for the controlled dispensing of pre-packaged products.

By way of example, FIG. 5 depicts an embodiment for the dispensing of pre-packaged products. Each of product modules 40 is a magazine filled with pre-packaged products. Product modules 40 are distributed along a conveying system 420 which can be a motorized conveyor belt system, a motorized or gravity-fed roller wheel type of conveyor system, or a system of guides or chutes that utilize, for example, gravity or a vacuum to move products therealong.

Regardless of its particular configuration, conveying system 420 could also be modularized to simplify its construction and repair. Accordingly, it is to be understood that the particular type of conveying system used by the present invention is not is not a limitation thereof.

Each of product modules 40 deposits its products 41 with conveying system 420 which transports them to their ultimate dispensing point. In the illustrated embodiment, products 41 are transported to one end of shipping container 10 where a dispensing magazine 422 receives products 41 and dispenses same. For example, dispensing magazine 422 can include one (or more) dispensing guide(s) 424 that receive each product 41 and eject it therefrom to begin the expulsion from shipping container 10.

To facilitate such expulsion, a door 44 of shipping container 10 can be configured as follows. Door 44 can be a motorized, hydraulic or otherwise mechanized door that either opens at a pre-programmed time or under the control of controller module 12 when expulsion of products 41 is to commence. Door 44 incorporates at least one guide channel 46. Door 44/guide channel 46 are configured such that when door 44 is opened as shown, guide channel 46 is aligned with dispensing guide 424. To take advantage of gravity, door 44 swings to a downward angle. In this way, each product 41 ejected from dispensing guide 424 slides under the force of gravity down guide channel 46. For applications involving the dispensing of products 41 in the air, guide channel 46 is typically an enclosed channel. In addition, if the height H of door 44 is not sufficient to define an optimal release position for products 41 (as may be the case for an in-air dispensing application), a guide extension 48 can be coupled to guide channel 46. For example, guide extension 48 could be fitted in guide channel 46 and configured to automatically slide to its extended position (as shown) when door 44 is fully opened.

For in-air dispensing applications where products 41 are of a substantial weight (e.g., on the order of 10–100 pounds or more), there may be concerns regarding safety of personnel on the ground and maintaining integrity of products 41 when they land on the ground. To address these concerns, each of products 41 can be specially wrapped as illustrated for a single product 41 in FIGS. 6 and 7. More specifically, product 41 has an outer wrapping 50 of a flexible material. Although not required, outer wrapping 50 generally will encompass the entirety of product 41 to protect same from dirt, humidity and/or water damage. Accordingly, outer wrapping 50 is generally made of an impermeable material such as any one of a variety of plastic materials without fiber reinforcement impregnated therein. Note that outer wrapping 50 can also be used to keep parts/components of product 41 from being lost during the dispensing process. Suitable wrapping materials and apparatus for wrapping same around product 41 are well known in the art.

Coupled to outer wrapping 50 is an assembly 52 that will function as an air drag device once product 41 is dispensed in the air from a moving aircraft. Assembly 52 is illustrated in its collapsed, pre-dispensed state in FIG. 6, and in its expanded, post-dispensed state in FIG. 7. Assembly 52 includes a sheet 54 of flexible material and one or more flexible tethers 56 coupled to sheet 54 and outer wrapping 50. For example, each of tethers 56 can be wrapped around and under product 41 for reasons that will be explained further below.

Figure 6:
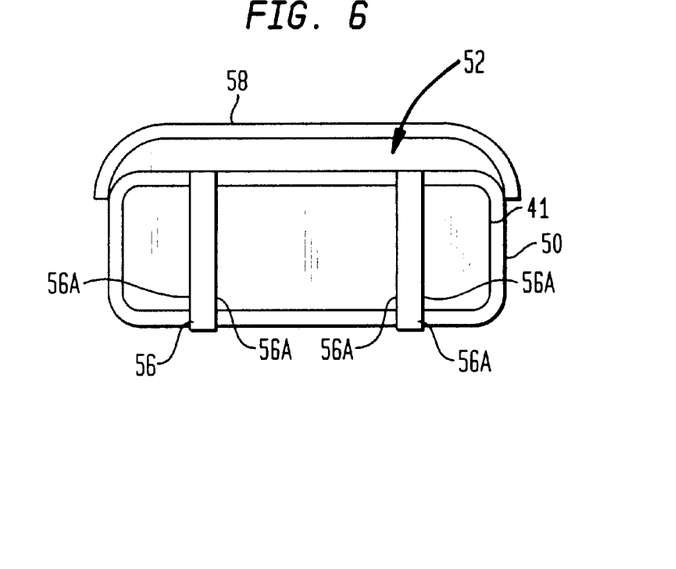
FIG. 6 is a schematic view of a product wrapped for dispensing into the air and is shown in its pre-dispensed configuration.

During the wrapping of product 41, sheet 54 and tethers 56 are collapsed against outer wrapping 50 as shown in FIG. 6. A low-tack tape 58 can be stretched over assembly 52 and attached to outer wrapping 50 to maintain assembly 52 in its collapsed state during pre-dispensing handling thereof. Once product 41 so-wrapped is released into a relatively moving air flow (as would be the case of product 41 so-wrapped were dispensed from shipping container 10 flown on-board an aircraft), assembly 52 opens to its post-dispensed state shown in FIG. 7. More specifically, as moving air gets under sheet 54, low-tack tape 58 fails as air pressure pushes upon sheet 54 causing it to expand and pull tethers 56 taught. Thus, sheet 54 acts as an air drag device (e.g,. parachute) on product 41 as it descends to the ground. Additional support for product 41 is provided by wrapping each of tethers 56 around and under product 41 as shown.

Suitable materials for each of sheet 54 and tethers 56 include a variety of plastic materials which may have reinforcing fibers impregnated therein. The materials used for outer-wrapping 50, sheet 54 and tethers 56 can be the same or different without departing from the scope of the present invention.

Figure 7:
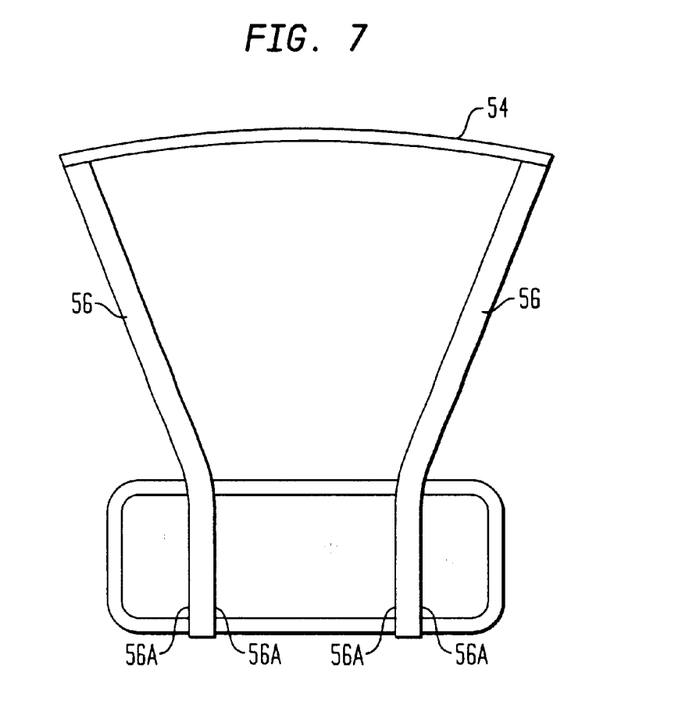
FIG. 7 is a schematic view of the product wrapped as shown in FIG. 6 after it has been dispensed into the air.

In situations requiring quick recovery of each product 41 landing on the ground, it may be desirable to provide for the quick removal as assembly 52 without the use of any tools. To facilitate such quick removal, tethers 56 can be attached to outer wrapping 50 by means of quick release seams 56A, the particular choice of which is not a limitation of the present invention.

Figure 8:
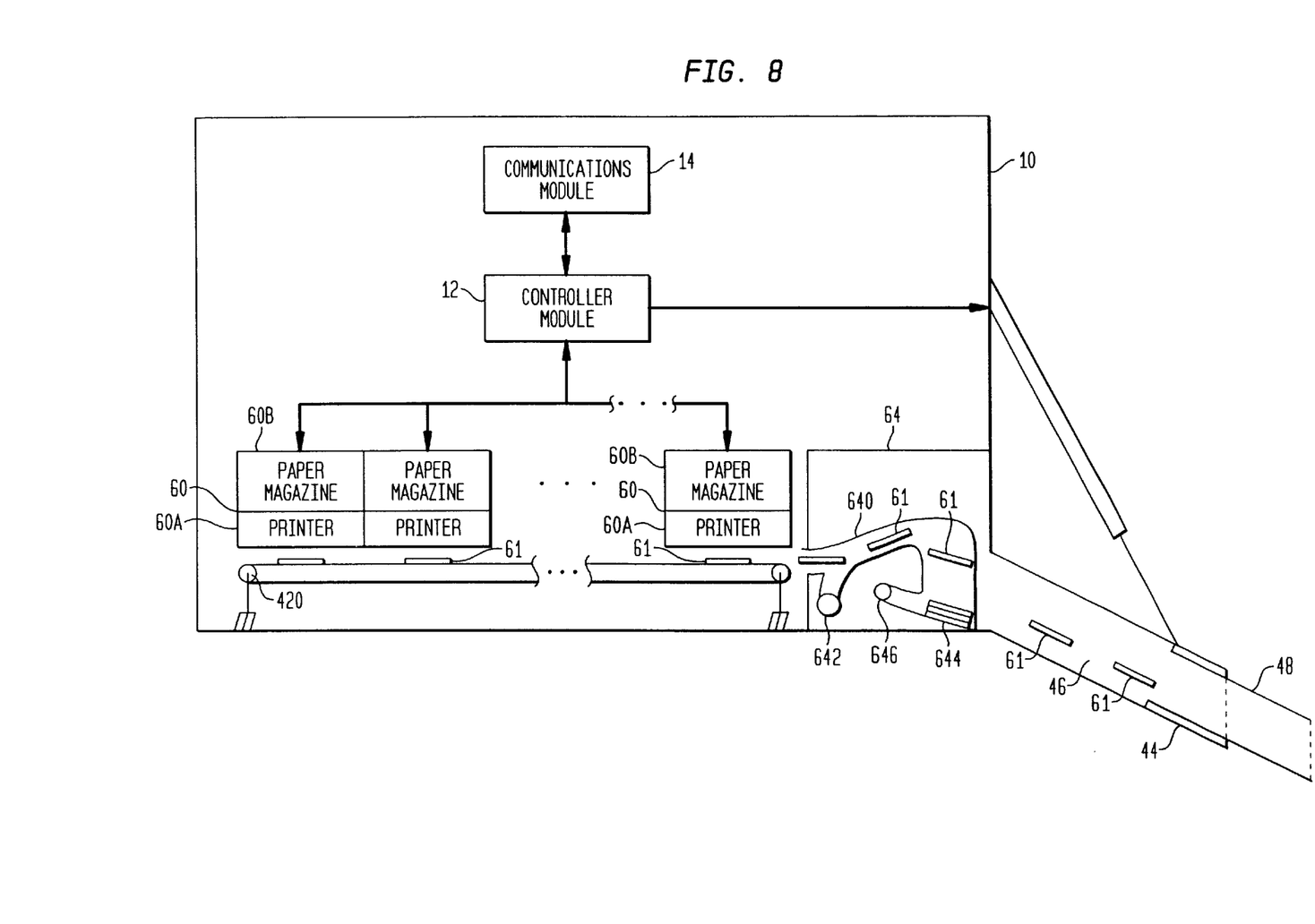
FIG. 8 is a schematic view of an unmanned container-based system for the generation and dispersal of printed materials in accordance with the present invention.

As mentioned earlier in the discussion of FIG. 4, product modules 40 could also be configured to generate the products that are to be dispensed using raw materials maintained onboard shipping container 10. By way of example, FIG. 8 depicts a shipping container-based system that generates and disperses printed materials in accordance with the present invention where like reference numerals will be used for the elements that are common with elements previously described herein. While a plurality of printing modules 60 are distributed along a conveying system 420, it is to be understood that the present invention could also be realized using as few as one printing module 60. Each of printing modules 60 could include a printer 60A and a paper magazine 60B supplying printer 60A. Controller module 12 is coupled to each printing module 60 to both control its printing function and to monitor the status thereof (i.e., amount of paper in magazine 60B, low ink/toner conditions, printer errors, etc.).

After printing, each printer 60A deposits its printed materials 61 onto conveying system 420 which transports them to one end of shipping container 10 where a dispensing magazine 64 receives printed materials 61, stores them and expels them from shipping container 10. More specifically, dispensing magazine 64 includes a receiving Chute 640 coupled to the end of conveying system 420. Printed materials 61 entering chute 640 can be directed therethrough by means of one or more forced air blowers 642. One or more dispensing stacks 644 receive printed materials 61 from chute 640 and store same until they are to be dispensed. Printed materials 61 can be dispensed once door 44 of shipping container 10 is opened as shown.

Door 44 can be configured as described earlier herein. That is, at least one guide channel 46 is formed in door 44. When door 44 is opened, guide channel 46 is aligned with the lower portion of dispensing stack 644. One or more forced air blowers 646 act on printed materials 61 in stack 644 causing them to be expelled through guide channel 46. If shipping container 10 is flown onboard an aircraft that provides for the opening of door 44 into the aircraft's slipstream, printed materials 61 are dispersed in the slipstream of the aircraft. As in the previously-described product dispensing embodiment, guide extension 48 can be provided if it is necessary to provide more distant release position for printed materials 61.

The invention as described thus far contemplates a single container and its contents. However, the present invention can be extended to a system that delivers a plurality of such standardized "smart" containers where each container houses its own separately controllable operational payload. The payloads can be the same or different from container to container. In order to facilitate handling, delivery and protection of a plurality of the present invention's "smart" containers 10, a system 70 is provided and illustrated in FIG. 9. Each of shipping containers 10 is equipped in one of the ways described above where all shipping containers 10 could be equipped identically or each one could be uniquely equipped.

Figure 9:
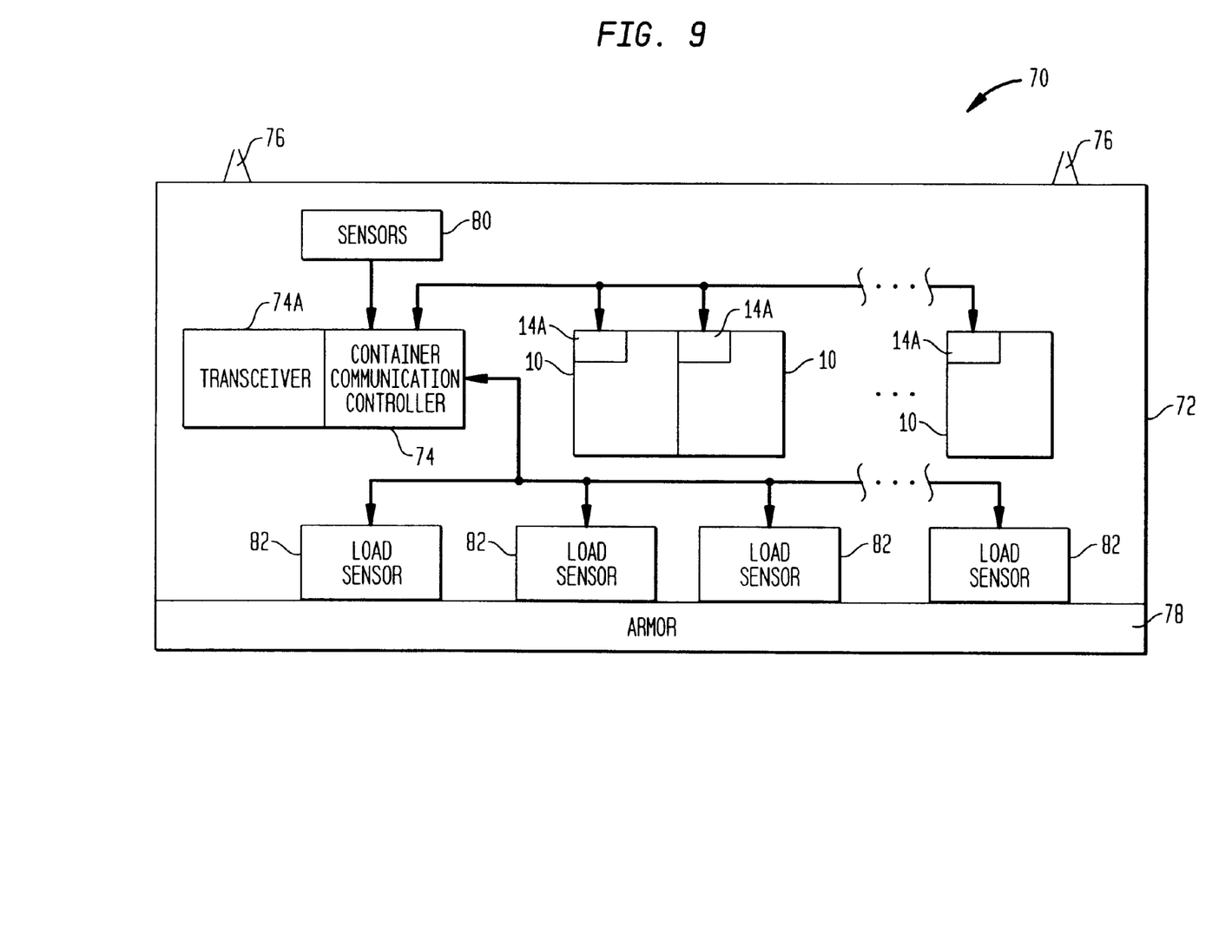
FIG. 9 is a schematic view of an unmanned system that facilitates the handling, delivery and protection of a plurality of shipping containers equipped in accordance with the present invention.

System 70 includes an outer structure 72 that mechanically receives each of shipping containers 10 in some positive fashion such as a slide-in bay, drop-in base, or in other ways known in the art. The choice of mechanical coupling of each shipping container 10 to structure 72 is not a limitation of the present invention. In addition, each shipping container 10 is coupled electronically to a container communications controller module 74. For example, each container's data port 14A could be "plugged" into controller module 74. Controller module 74 can then monitor the status of each shipping container 10, provide data (e.g., sensor data, position data, etc.) to each shipping container 10, and provide any other control function as required by a specific application. Controller module 74 can be pre-programmed or controlled in real time from a remote location via, for example, a transceiver portion 74A of controller module 74 that could operate in the same fashion as communications module 14 in each of shipping containers 10.

Structure 72 typically includes lifting points 76 that are used when a crane lifts structure 72 onto a transport vehicle/ship or when structure 72 is lifted by means of an aircraft. Construction of structure 72 can vary with the particular application. For example, structure 72 could be implemented by a frame type of assembly (i.e., minimal or no solid walls) that provided for the loading of structure 72 from the sides and/or top thereof, while also allowing an individual container's side, bottom or top doors (not shown in FIG. 7) to be opened as needed for dispensing of their payloads. Alternatively, structure 72 can be a closed, solid-wall structure having its own side, bottom and/or top doors individually controlled by controller module 74. In this case, appropriate ones of shipping containers 10 could be notified by controller module 74 when the doors of structure 72 were opened.

System 70 can also be equipped with armor 78 along its bottom (as shown) or at other appropriate portions thereof. System 70 can also be equipped with sensors 80 that provide controller module 74 and, ultimately each of shipping containers 10, with critical sensed data. In this way, one set of sensors could serve a plurality of the shipping containers that are designed to remain together for a given mission.

The loading of loaded shipping containers 10 on or into structure 72 will typically occur on a one-by-one basis. Since the weight of each loaded shipping container 10 can be substantial, the overall load balance of system 70 at any given time could be of concern. Accordingly, a plurality of load sensors 82 can be distributed about and coupled to structure 72 for sensing the load thereat at any given time. The output of load sensors 82 can be supplied to controller module 74 which can either process the sensed load data locally or pass it on to a remote location/processor via transceiver portion 74A. The sensed load data can be used, for example, to indicate critical load imbalances, to indicate the location in structure 72 that the next loaded shipping container should occupy to balance the overall load of system 70, to indicate the overall load of system 70 which is important to the vehicle transporting same, and to indicate changing status of the overall load of system 70 as shipping container payloads are dispensed.

The advantages of the present invention are numerous. The standardized "smart" shipping container equipped as described herein provides a new type of unmanned system that can be used to generate and disperse printed materials. The system can provide high-capacity, high-reliability via redundancy (i.e., multiple printing modules) and a high volume output. The printed materials can incorporate in-theater imagery from, for example, sensors 80 onboard system 70 or from a separate reconnaissance system. This provides command, emergency response, civil defense or commercial authorities the opportunity to react immediately to situations that are observed, and provides them the opportunity to immediately adapt the printed materials to changing situations. The shipping container can be mounted onboard an unmanned aircraft and flown over an area of concern with control of the printing modules being provided from a remote/safe location.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An unmanned system for the generation and dispersement of printed materials, comprising:

a standardized shipping container;

at least one printing module mounted in said shipping container for generating printed materials;

a controller module mounted in said shipping container and coupled to said printing module for controlling the generation of said printed materials and for monitoring status of said printing module;

a communications module mounted in said shipping container and coupled to said controller module for communicating with said printing module via said controller module and for transmitting said status to a remote location; and dispensing means coupled to said printing module for receiving said printed materials so-geherated and for expelling said printed materials from said shipping container.

2. An unmanned system as in claim 1 wherein said shipping container is an ISO shipping container.

3. An unmanned system as in claim 1 further comprising armor coupled to at least a portion of said shipping container for protecting said shipping container from strikes by projectiles.

4. An unmanned system as in claim 1 wherein said controller module is pre-programmed.

5. An unmanned system as in claim 1 wherein said controller module is programmable in real time by remotely-sent instructions received by said communications module.

6. An unmanned system as in claim 1 wherein said communications module includes a wireless transceiver.

7. An unmanned system as in claim 1 further comprising means, mounted in said shipping container and coupled to said controller module, for autonomously establishing a global position of said shipping container.

8. An unmanned system as in claim 7 wherein said means is selected from the group consisting of a GPS system and an inertial navigation system.

9. An unmanned system as in claim 1 further comprising propulsion means coupled to said shipping container and said controller module, wherein said shipping container can be maneuvered under control of said controller module.

10. An unmanned system as in claim 1 further comprising means coupled to said shipping container for placing said shipping container in a preferred orientation when said shipping container is released into a fluid environment.

11. An unmanned system as in claim 1 further comprising means mounted on the outside of said shipping container for facilitating handling thereof.

12. An unmanned system as in claim 1 further comprising means mounted on the outside of said shipping container for facilitating connection with an adjacent shipping container.

13. An unmanned system as in claim 1 wherein said shipping container is waterproof.

14. An unmanned system as in claim 1 wherein said shipping container incorporates EMI shielding.

15. An unmanned system as in claim 1 further comprising means coupled to said shipping container for mitigating shock forces experienced by said shipping container.

16. An unmanned system as in claim 1 further comprising means coupled to said shipping container for controlling climatic conditions within said shipping container.

17. An unmanned system as in claim 1 wherein said shipping container includes a mechanized door coupled to said controller module for the controlled opening and closing of said door, and wherein said dispensing means includes guide means coupled to said door for guiding said printed materials to be expelled from said shipping container to a position outside of said shipping container when said door is open wherein said printed materials are released into the ambient environment at said position.

18. An unmanned system as in claim 17 wherein said guide means comprises at least one enclosed channel formed in said door.

19. An unmanned system as in claim 18 further comprising means coupled to said door for extending said enclosed channel.

20. An unmanned system as in claim 1 wherein said printing module comprises:
a supply of paper; and
at least one printer coupled to said supply of paper, said controller module and said dispensing means, said printer printing on said paper as dictated by said controller module to generate said printed materials received by said dispensing module.

21. An unmanned system for the generation and dispersement of printed materials, comprising:
a standardized shipping container;
conveying means mounted in said shipping container for transporting items within said shipping container;
a plurality of printing modules mounted in said shipping container and distributed along said conveying means for generating printed materials and for transferring said printed materials to said conveying means;
a controller module mounted in said shipping container and coupled to each of said plurality of printing modules for controlling the generating of said printed materials and for monitoring status of each of said plurality of printing modules;
a communications module mounted in said shipping container and coupled to said controller module for communicating with each of said plurality of printing modules via said controller module and for transmitting said status to a remote location; and
dispensing means coupled to said controller module and said conveying means for receiving said printed materials and for expelling said printed materials from said shipping container in accordance with instructions received from said controller module.

22. An unmanned system as in claim 21 wherein said shipping container is an ISO shipping container.

23. An unmanned system as in claim 21 further comprising armor coupled to at least a portion of said shipping container for protecting said shipping container from strikes by projectiles.

24. An unmanned system as in claim 21 wherein said controller module is pre-programmed.

25. An unmanned system as in claim 21 wherein said controller module is programmable in real time by remotely-sent instructions received by said communications module.

26. An unmanned system as in claim 21 wherein said communications module includes a wireless transceiver.

27. An unmanned system as in claim 21 further comprising means, mounted in said shipping container and coupled to said controller module, for autonomously establishing a global position of said shipping container.

28. An unmanned system as in claim 27 wherein said means is selected from the group consisting of a GPS system and an inertial navigation system.

29. An unmanned system as in claim 21 further comprising propulsion means coupled to said shipping container and said controller module, wherein said shipping container can be maneuvered under control of said controller module.

30. An unmanned system as in claim 21 further comprising means coupled to said shipping container for placing said shipping container in a preferred orientation when said shipping container is released into a fluid environment.

31. An unmanned system as in claim 21 further comprising means mounted on the outside of said shipping container for facilitating handling thereof.

32. An unmanned system as in claim 21 further comprising means mounted on the outside of said shipping container for facilitating connection with an adjacent shipping container.

33. An unmanned system as in claim 21 wherein said shipping container is waterproof.

34. An unmanned system as in claim 21 wherein said shipping container incorporates EMI shielding.

35. An unmanned system as in claim 21 further comprising means coupled to said shipping container for mitigating shock forces experienced by said shipping container.

36. An unmanned system as in claim 21 further comprising means coupled to said shipping container for controlling climatic conditions within said shipping container.

37. An unmanned system as in claim 21 wherein said shipping container includes a mechanized door coupled to said controller module for the controlled opening and closing of said door, and wherein said dispensing means includes guide means coupled to said door for guiding said printed materials to be expelled from said shipping container to a position outside of said shipping container when said door is open wherein said printed materials are released into the ambient environment at said position.

38. An unmanned system as in claim 37 wherein said guide means comprises at least one enclosed channel formed in said door.

39. An unmanned system as in claim 38 further comprising means coupled to said door for extending said enclosed channel.

40. An unmanned system s in claim 21 wherein said dispensing means includes means for staging said printed materials prior to expulsion from said shipping container.

* * * * *